No. 655,655. Patented Aug. 7, 1900.
J. B. JARMIN.
AUTOMATIC CHECK ROW CORN PLANTER.
(Application filed Apr. 21, 1900.)
(No Model.) 5 Sheets—Sheet 1.
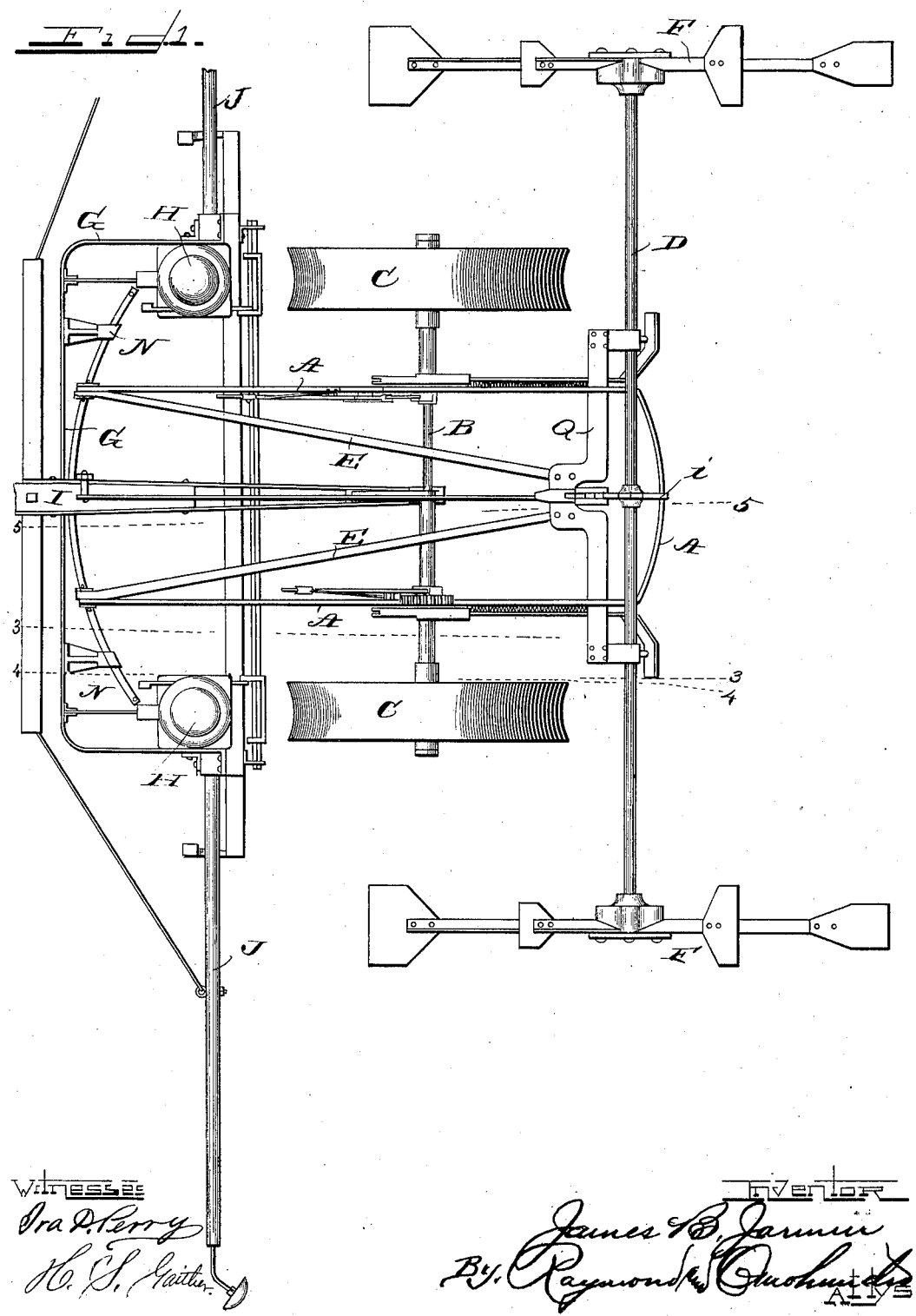

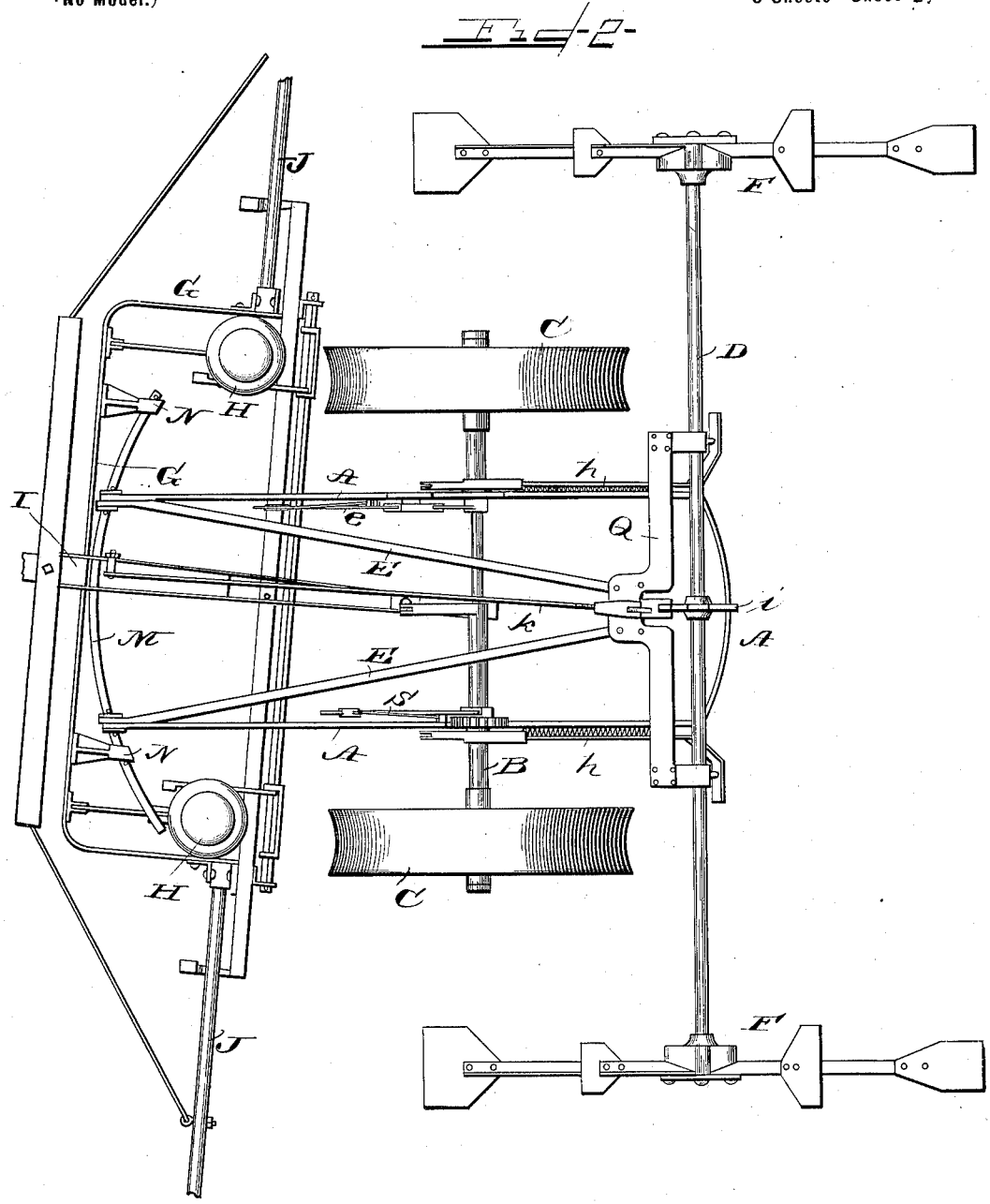

No. 655,655. Patented Aug. 7, 1900.
J. B. JARMIN.
AUTOMATIC CHECK ROW CORN PLANTER.
(Application filed Apr. 21, 1900.)
(No Model.) 5 Sheets—Sheet 3.
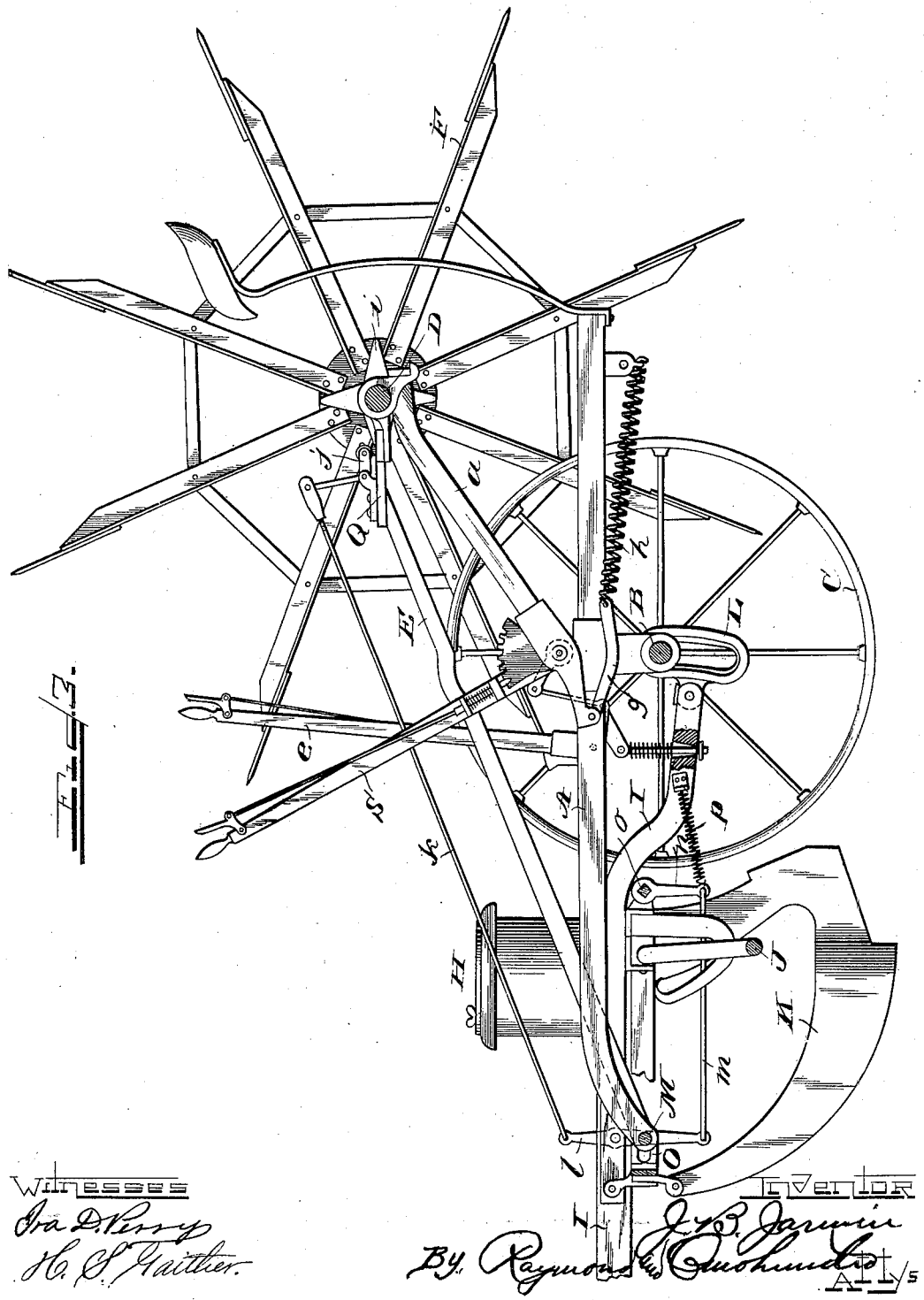

No. 655,655. Patented Aug. 7, 1900.
J. B. JARMIN.
AUTOMATIC CHECK ROW CORN PLANTER.
(Application filed Apr. 21, 1900.)
(No Model.) 5 Sheets—Sheet 4.
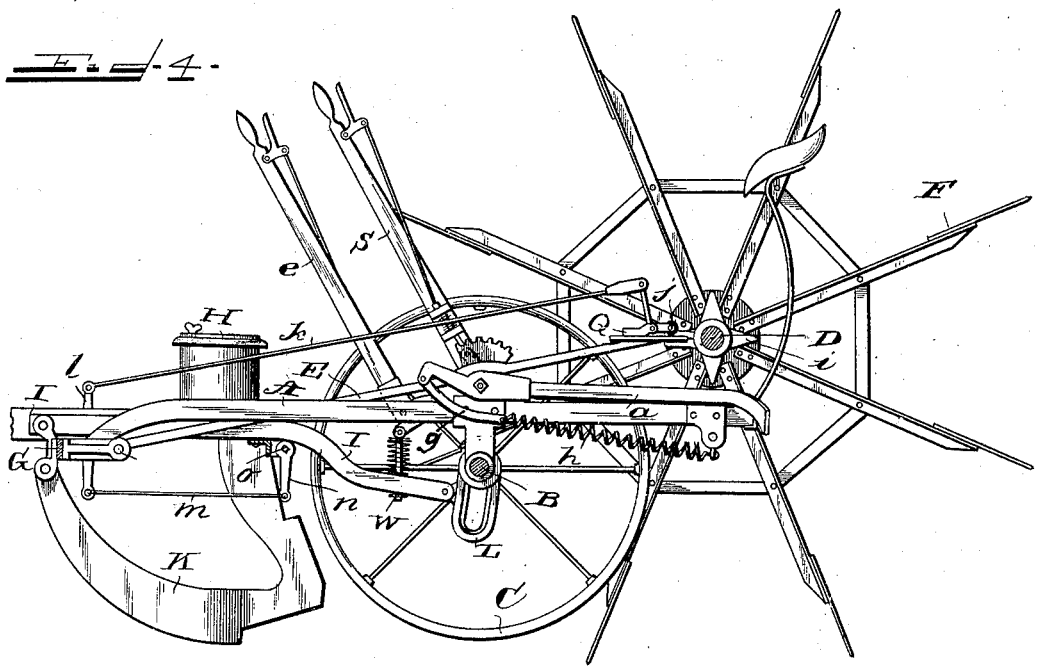
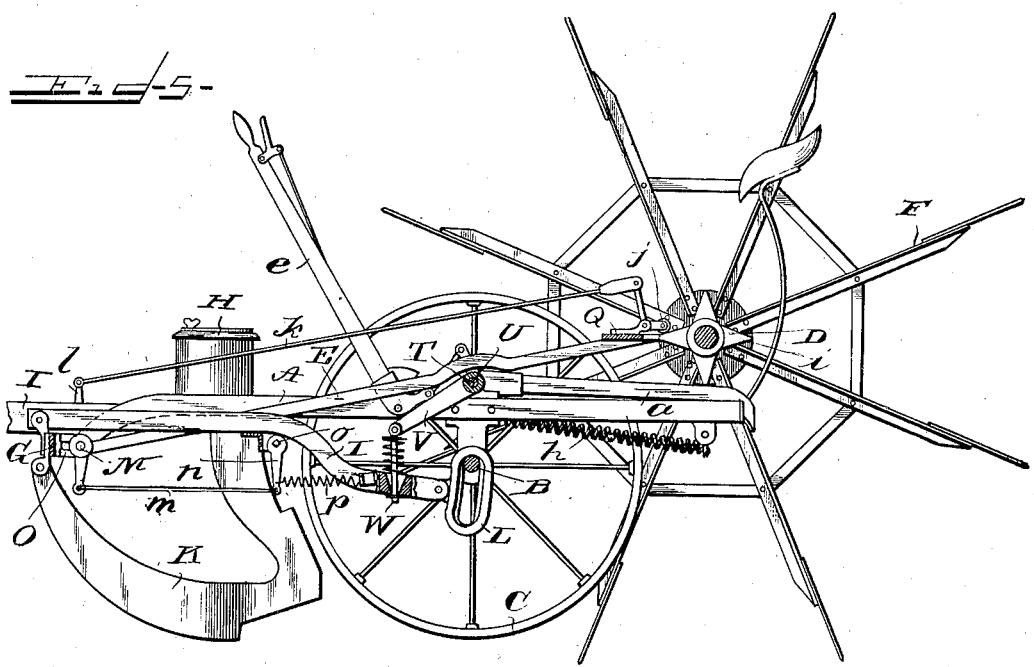
Witnesses
Ora D. Perry
H. S. Gaither
Inventor
James B. Jarmin
By Raymond & Cushman Attys
THE NORRIS PETERS CO., PHOTO-LITHO., WASHINGTON, D. C.

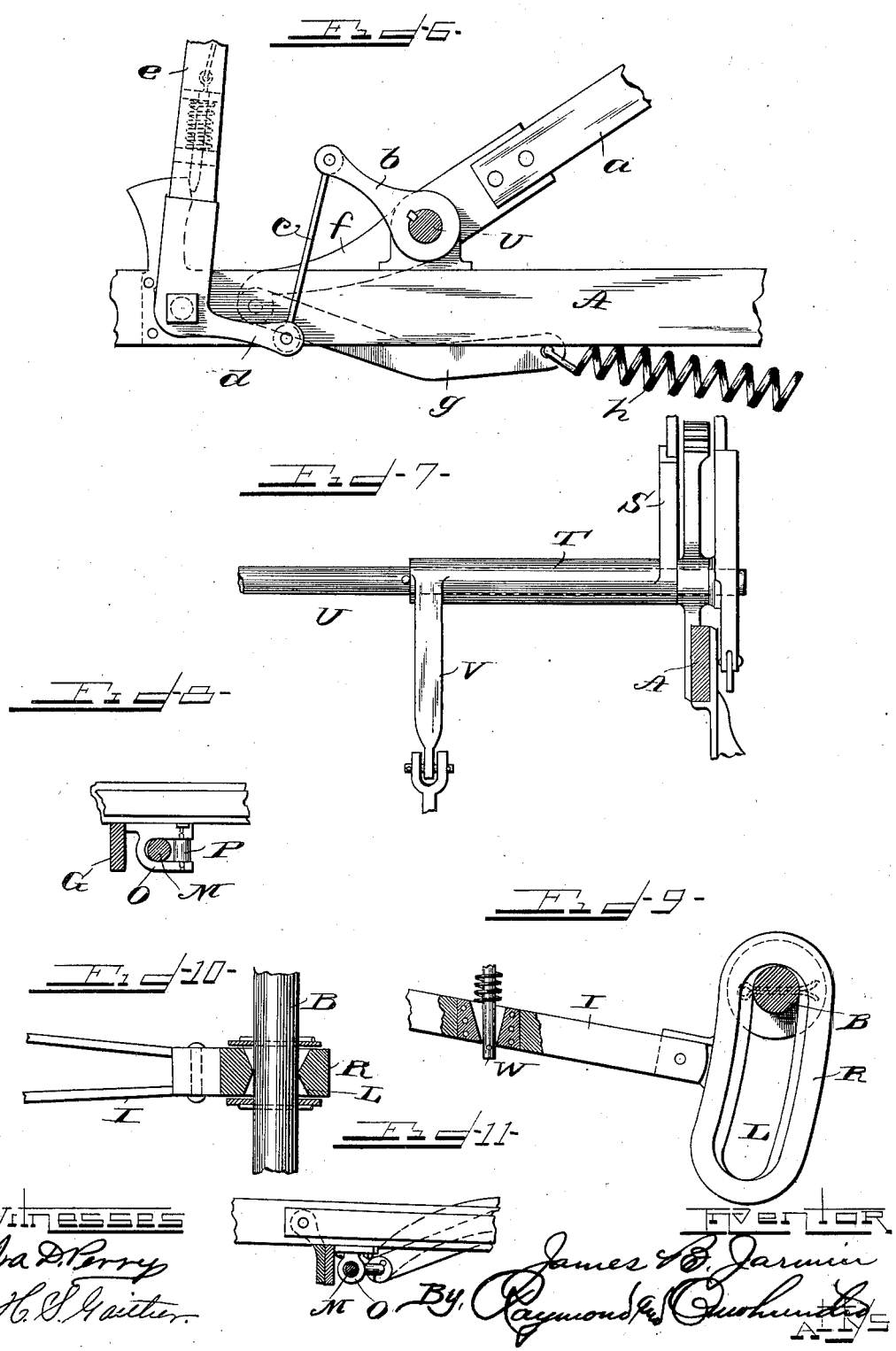

UNITED STATES PATENT OFFICE.

JAMES B. JARMIN, OF DAVENPORT, IOWA, ASSIGNOR TO THE IMPLEMENT MANUFACTURING COMPANY, OF SAME PLACE.

AUTOMATIC CHECK-ROW CORN-PLANTER.

SPECIFICATION forming part of Letters Patent No. 655,655, dated August 7, 1900.

Application filed April 21, 1900. Serial No. 13,713. (No model.)

*To all whom it may concern:*

Be it known that I, JAMES B. JARMIN, a citizen of the United States, residing at Davenport, in the county of Scott and State of Iowa, have invented certain new and useful Improvements in Automatic Check-Row Corn-Planters, of which the following is a specification.

This invention relates to improvements in automatic check-row corn-planters of that class exemplified in Letters Patent of the United States No. 630,891, granted me on the 15th day of August, A. D. 1899, in which the distinguishing feature is a flexible connection between the marker and the planter of such character that the planter may be turned or deflected from a straight course without deflecting the marker.

The broad object of this invention is the same as that in my aforesaid patent; but in the present instance I propose to have the flexible connection of such character that the front frame and tongue of the planter may be deflected without turning the main or back frame of the planter or the marker attached thereto.

Another object is to have the tongue pivotally connected with the planter-axle in such manner that the draft will be directly applied to the axle and through the main frame to the marker attachment, while the front frame carrying the seedboxes shall be rigidly secured to and removable with the tongue.

These and such other objects as may hereinafter appear are attained by the devices illustrated in the accompanying drawings, in which—

Figure 1 is a plan view of a planter embodying my invention, showing the marker and planter in normal relative position when the machine is traveling in a straight line. Fig. 2 is a view similar to Fig. 1, but showing an abnormal position of the planter when the team is turned out of the line of travel of the machine. Fig. 3 is a vertical section on the line 3 3 of Fig. 1. Fig. 4 is a vertical section on the line 4 4 of Fig. 1, showing the marker part way down. Fig. 5 is a vertical section on the line 5 5 of Fig. 1. Fig. 6 is an enlarged sectional elevation of the mechanism for operating the lifting-arms; and Figs. 7 to 11, inclusive, are detail views that will be described farther on.

Similar letters of reference indicate the same parts in the several figures of the drawings.

In its general features my present machine does not differ materially from that previously patented in that it has a main wheel or a back frame A, mounted upon an axle B, carried in ground-wheels C, a marker-shaft D, connected with the main frame by coupling-bars E and having mounted upon its outer ends spade marker-wheels F, and a front or runner frame G, carrying the seedboxes H, with suitable seed-dropping mechanism, and rigidly secured to a tongue I, a drag-marker J also being secured to the front frame at opposite sides thereof, all of said parts being of any usual or desired construction. The marker attachment is free to have the usual members independent of the planter and will remain unaffected by lateral turning of the tongue and front frame and may be raised and lowered as heretofore. The front frame, with its runners or furrow-openers K, may also be raised and lowered as heretofore. While there is a horizontal pivotal connection between the front and back frames, as heretofore, to provide for the raising and lowering of the front frame, this machine differs from all others in providing for a bodily lateral movement or turning of the front frame independent of the back frame. To this end the tongue, while rigidly secured as heretofore to the front frame, has a swivel connection with the axle B by means of the vertically-elongated eye L, through which the axle passes, said eye being formed on a curve corresponding with the arc of a circle struck from the center of the sliding pivot guide-rod M, which rigidly connects the forward ends of the side bars of the frame A, thus forming a part of said frame while it passes through eyes N at each side of the front frame and a horizontal elongated eye O at the center of the front frame beneath the tongue, said guide-rod being curved horizontally on an arc struck from the center of the axle. The central eye is preferably formed in a bracket-casting, as shown in Fig. 8, rigidly secured to the under side of the tongue or to the forward frame G, immediately under the tongue, in which bracket is mounted a vertical roller P, which constitutes the rear end of the eye through which the guide-rod M works. It is of course intended that practically all of the draft shall be taken direct from the axle and the rod M should normally have slight, if any, bearing against the roller P; but in the event of undue strain or slight wear of the parts which has been properly taken up the presence of this roller will serve to reduce friction between the rod and its guiding-eyes, and, if desirable, the guide-brackets having the eyes N may also be provided with antifriction-rollers similar to the one above described. The guide-rod M also passes through slightly-enlarged holes in the forward ends of the coupling-bars E, the ends of said bars terminating adjacent to the ends of the side bars of the main frame A and the guide-rod being held against endwise movement in said bars by pins passing therethrough or in any other suitable manner.

The coupling-bars E, at their rear ends, are rigidly secured to a cross-bar Q, in which the shaft D of the marker is loosely journaled, so as to rotate freely therein, though prevented from having endwise movement therein by collars, cotter-pins, or other usual devices. It will thus be seen that while the marker attachment is rigidly connected with the main frame of the planter it is flexibly connected with the tongue and forward frame of the planter through the intermediary of the connections before described, and hence not only may the marker be raised and lowered bodily or either one of the wheels F rise or fall below the other while at work upon the ground or in crossing a furrow, but the marker, as well as the main frame of the machine, will not be turned out of line whenever the team for any reason swerves to the right or left from the straight line of travel, for, as plainly shown in Fig. 2, only the tongue and the front frame will be deflected, the marker and the main frame remaining in the straight line of travel. To accomplish this result, it is necessary that the tongue should have a swivel connection with the axle, which will permit the forward end of the tongue to move both vertically and horizontally without strain upon the planter. This may be effected by having the walls of the coupling-link R, in which is formed the elongated eye L, taper toward the center from each side thereof, as clearly shown in Fig. 10, so that as between the axle and the link there is but one point of bearing and that at the center of width of the link. The elongated eye in the coupling-link serves to permit the raising and lowering of the forward frame, carrying with it the furrow-openers, by means of a latch-lever S, secured to a sleeve T, mounted upon a rock-shaft U immediately above the axle B, (see Figs. 5 and 7,) the opposite end of which sleeve is provided with a crank-arm V, connected by a spring-rod W with the tongue just forward of the coupling-link. Hence when the latch-lever S is drawn back by the driver the sleeve T will be rocked on the shaft U, raising the arm V and carrying up with it the rear end of the tongue, and as the forward end of the tongue is supported from the yoke of the team, as usual, the front frame and the runners will be lifted from the ground or lowered to the ground, when this operation is reversed. The raising and lowering of the marker are accomplished by means of a pair of lifting-arms $a$, rigidly mounted upon the rock-shaft U, (see Fig. 6,) which shaft has mounted thereon at one side thereof a crank-arm $b$, connected by a rod $c$ with an angular short arm $d$ on the latch-lever $e$, pivoted to the main frame A. The lifting-arms $a$ are prolonged, as at $f$, beyond the rock-shaft U and have pivotally connected therewith a link $g$, to the opposite end of which is connected one arm of a coil-spring $h$, the opposite end of which is attached to the main frame A near the rear end thereof. There is one of these springs for each of the lifting-arms, and they coact with the latch-lever $e$ to assist in raising the marker from the ground. Thus when the latch-lever $e$ is drawn back by the driver from the position shown in Figs. 4 and 5 to that shown in Fig. 3 the shaft U will be partially rotated and the lifting-arms raised, as shown in Figs. 3 and 6, carrying with them the marker, the springs $h$ during such action retracting and assisting in the lifting operation.

The above-described mechanism is illustrated and briefly described, but not claimed in another application filed by me of even date herewith, Serial No. 13,714.

The means for operating the seed-dropping mechanism from the marker-shaft are substantially identical with those described and claimed in Letters Patent No. 638,721, granted me on the 12th day of December, 1899, and comprises a star-wheel $i$, keyed upon the marker-shaft D at the center of length thereof in position to have the points thereof strike a bell-crank lever $j$, pivotally mounted upon the cross-bar Q of the marker attachment, the opposite end of said lever being connected by a rod $k$ with one end of a lever $l$, pivoted to the tongue or the forward frame, the opposite end of said lever being in turn connected by a rod $m$ with a crank-arm $n$ upon a rock-shaft $o$, connected with and operating the seed-dropping mechanism, a coil-spring $p$, attached at its ends, respectively, to the crank-arm $n$ and the tongue I, serving to restore the parts to normal position whenever operated by the star-wheel. I therefore do not desire to claim these devices in the present application.

As shown in Fig. 11, the vertical roller P may be dispensed with and a simple eye-bracket O be employed as a guide for the rod M at the center of the forward frame, and, indeed, other changes that will readily suggest themselves to one skilled in the art to which my invention appertains may be made without departing from the spirit of my invention. For instance, so long as the marker is vertically movable, but laterally immovable, with relation to the frame, it is immaterial whether the marker is attached to the forward frame, as well as the main frame, or whether it be attached to the main frame alone and at a point removed from that shown in the drawings. Furthermore, it will of course be understood that all the points where play is necessary to proper operation of the machine sufficient looseness of feed will be provided to accomplish the desired result.

Having thus fully described my invention, what I claim, and desire to secure by Letters Patent, is—

1. In an automatic corn-planter, the combination with a back frame and a marker attachment vertically movable, but laterally immovable, with relation to each other, of a front frame and a tongue rigidly connected together, a lateral sliding pivot connection between the front and the back frame and a flexible connection between the tongue and the axle of the main frame, substantially as described.

2. In an automatic corn-planter, the combination with a main frame and the marker attachment comprising a pair of coupling-bars, of the front frame, the tongue rigidly secured thereto, a guide-rod pivotally connecting the front and back frame and the coupling-bars and a swivel connection between the tongue and the axle of the back frame, substantially as described.

3. In an automatic corn-planter, the combination with a back frame and a marker attachment vertically movable, but laterally immovable, with relation to each other, of a front frame and a tongue rigidly connected together, a lateral sliding pivot connection between the front and the back frame, the axle of the back frame, a vertically-elongated coupling-link secured to the rear end of the tongue and through which the axle passes and a latch-lever pivoted upon the back frame and connected with the tongue near the rear end thereof, substantially as described.

4. In an automatic corn-planter, the combination with a main frame and the marker attachment comprising a pair of coupling-bars, of the front frame, the tongue rigidly secured thereto, a guide-rod pivotally connecting the front and back frame and the coupling-bars, a guide-loop on the front frame through which the guide-rod passes, an anti-friction-roller mounted thereon at the rear side of the loop-eye, the axle of the main frame, a coupling-link secured to the rear end of the tongue and having an elongated eye through which the axle passes, a latch-lever pivoted to the back frame and connected with the tongue near the rear end thereof, substantially as described.

5. In an automatic corn-planter, the combination with a back frame and the marker attachment, of a pair of lifting-arms mounted upon a rock-shaft, prolongations on said arms to the opposite side of said shaft, springs connected at their ends, respectively, to said prolongations and the back frame, a crank-arm on the rock-shaft and a latch-lever pivoted on the back frame and connected with, so as to actuate, said crank-arm, substantially as described.

JAMES B. JARMIN.

Witnesses:
HENRY THUENEN, Jr.,
HARRIET CURNYN.